United States Patent [19]

Shroyer et al.

[11] Patent Number: 4,805,010
[45] Date of Patent: Feb. 14, 1989

[54] STILL VIDEO CAMERA WITH COMMON CIRCUIT FOR COLOR BALANCE AND EXPOSURE CONTROL

[75] Inventors: Richard A. Shroyer, Rochester; Thomas C. Nutting, Fairport, both of N.Y.

[73] Assignee: Eastman Kodak Company, Rochester, N.Y.

[21] Appl. No.: 56,628

[22] Filed: May 29, 1987

[51] Int. Cl.[4] .................................................. H04N 9/73
[52] U.S. Cl. ...................................... 358/29; 358/41; 358/909
[58] Field of Search .................. 358/41, 29 C, 27, 29, 358/228, 909

[56] References Cited

U.S. PATENT DOCUMENTS

| | | | |
|---|---|---|---|
| 3,877,068 | 4/1975 | Kosdka | 358/29 |
| 3,936,870 | 2/1976 | Nakamura | 358/27 |
| 3,971,065 | 7/1976 | Bayer | 358/41 |
| 4,047,202 | 9/1977 | Poetsch | 358/29 |
| 4,123,775 | 10/1978 | Bugni | 358/10 |
| 4,218,699 | 8/1980 | Dischert et al. | 358/29 |
| 4,281,337 | 7/1981 | Nakamura | 358/29 |
| 4,338,514 | 7/1982 | Bixby | 250/201 |
| 4,338,625 | 7/1982 | Yamanaka | 358/29 |
| 4,395,730 | 7/1983 | Shen | 358/29 |
| 4,456,931 | 6/1984 | Toyoda et al. | 358/335 |
| 4,466,018 | 8/1984 | Soneda et al. | 358/213 |
| 4,499,487 | 2/1985 | Takayama et al. | 358/41 |
| 4,503,508 | 3/1985 | Brooks et al. | 364/525 |
| 4,504,854 | 3/1985 | Masuda | 358/44 |
| 4,541,016 | 9/1985 | Machida et al. | 358/228 |
| 4,544,952 | 10/1985 | VanCang | 358/210 |
| 4,551,764 | 11/1985 | Ogawa | 358/228 |
| 4,562,459 | 12/1985 | Sokei | 358/27 |
| 4,567,509 | 1/1986 | Takayama et al. | 358/29 |
| 4,567,510 | 1/1986 | Tanaka et al. | 358/44 |
| 4,584,598 | 4/1986 | Kutaragi | 358/29 |
| 4,584,610 | 4/1986 | Mizokami et al. | 358/228 |
| 4,589,023 | 5/1986 | Suzuki et al. | 358/213 |
| 4,638,350 | 1/1987 | Kato et al. | 358/29 |
| 4,646,161 | 2/1987 | Tsuchiya et al. | 358/29 |
| 4,660,075 | 4/1987 | Hashimoto et al. | 358/29 |
| 4,682,210 | 7/1987 | Ikemura et al. | 358/29 |

FOREIGN PATENT DOCUMENTS

| | | |
|---|---|---|
| 263295 | 4/1988 | European Pat. Off. . |
| 128694 | 6/1986 | Japan . |
| 421 | 1/1988 | World Int. Prop. O. . |

OTHER PUBLICATIONS

Research Disclosure, Apr. 1983, No. 22822, pp. 157–159.
Research Disclosure, Mar. 1982, No. 21504, pp. 70–71.

Primary Examiner—James J. Groody
Assistant Examiner—Robert M. Bauer
Attorney, Agent, or Firm—David M. Woods

[57] ABSTRACT

A video still camera includes a common integrating circuit for measuring light level in relation to both color balance and exposure control. An exposure photodiode generates an exposure signal from a small sample of image light diverted from the optical section of the camera. Broadly oriented red, green and blue photodiodes generate three color balance signals corresponding to the color characteristics of the illuminant. The photodiodes are selectively multiplexed into the input of the integrating circuit for the measurements. In one embodiment, the exposure photodiode remains connected to the integrating circuit for exposure measurement. The color balance measurement is unaffected because the small photocurrent from the exposure photodiode is effectively swamped by the much larger color photocurrent from a multiplexed color photodiode.

8 Claims, 1 Drawing Sheet

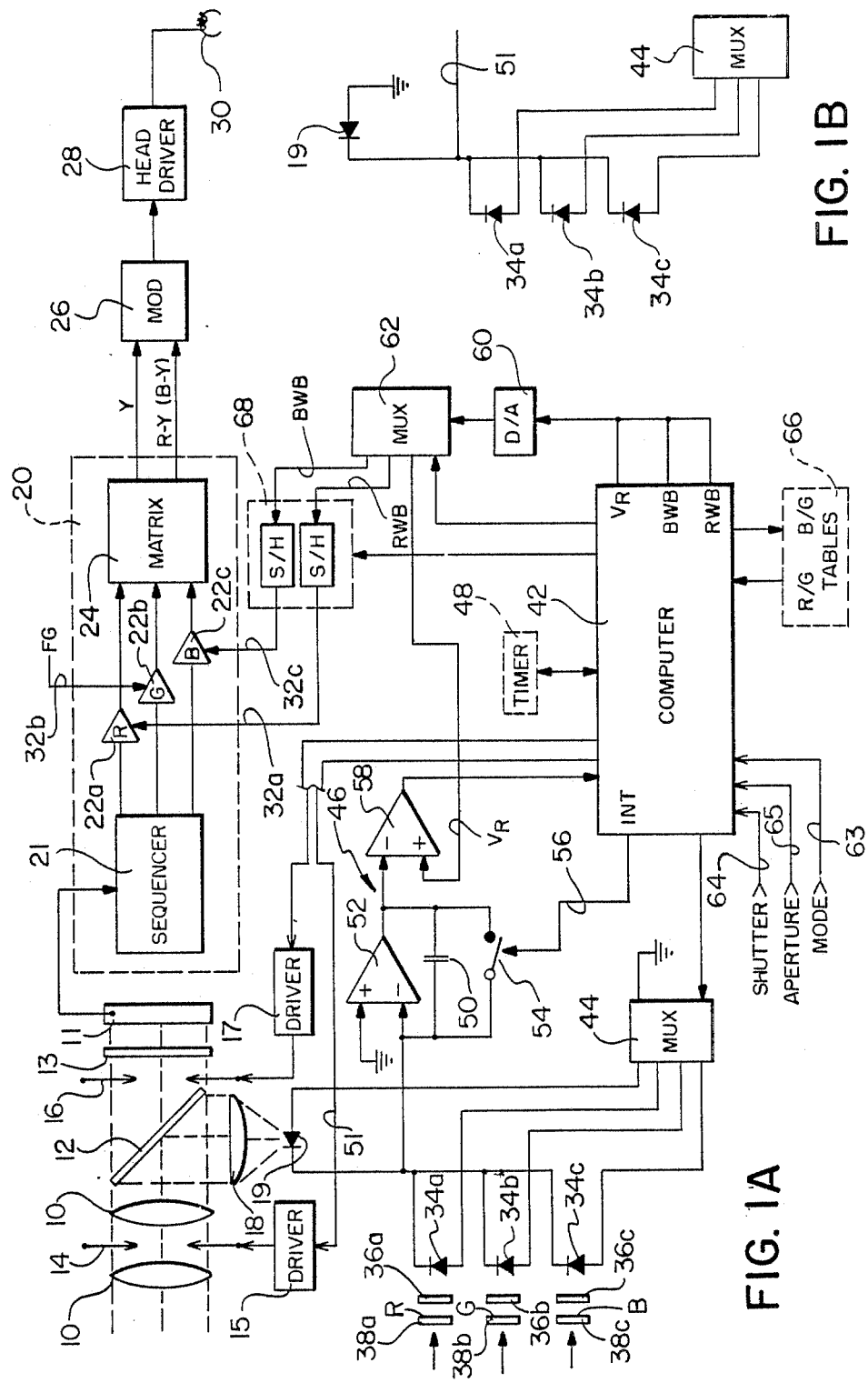

STILL VIDEO CAMERA WITH COMMON CIRCUIT FOR COLOR BALANCE AND EXPOSURE CONTROL

BACKGROUND OF THE INVENTION

1. Field of the Invention

This invention pertains to the field of video cameras, in particular, to color balance and exposure control circuits for a still video camera.

2. Description Relative to the Prior Art

In a still video camera, it is desirable that exposure time and optical aperture are both adjustable, thus varying, respectively, the length of exposure and the intensity of the light striking an image sensor in the camera. For example, in order to obtain a distinct still image of an object in motion, it is necessary to shorten the exposure time so as to prevent image blur. In shortening the exposure time it is ordinarily necessary to open the aperture so as to maintain the same total exposure. On the other hand, in order to obtain a distinct still image over a broad distance range, it is necessary to close down the aperture so as to extend the depth of field. Then the exposure time would have to be lengthened accordingly. A still video camera capable of such adjustments is shown, for example, in U.S. Pat. No. 4,541,016. The disclosed camera includes an aperture-preferred exposure control system in which the exposure time is controlled by comparing the peak level of the signal from the image sensor with a reference signal having an amplitude characteristic corresponding to the pre-set aperture.

In addition to controlling the exposure time, it is desirable to control the color balance of the camera. A video camera is correctly color-balanced when it reproduces a picture of a white card as a neutral white without any identifiable hue. (As a result, color balance for a video camera is often referred to as white balance.) Such a balance is ordinarily obtained when the card is illuminated with the light source used for recording and the red, green, and blue signal channels provide equal output amplitudes. If the light source is changed, such as in going from an indoor (tungsten or fluorescent lighting) to an outdoor setting, the camera must be rebalanced to provide the same output in relation to the white card with the new source of lighting (in this case, the sun). The usual practice is to hold the gain of the green channel fixed and alter the gain of the red and blue channels until the red and blue amplitudes match the green amplitude.

It is clearly inconvenient to have to manually rebalance the red and blue channels whenever illumination conditions change, and especially inconvenient to do so in connection with a white card. Moreover, the illumination should come from as wide an area as possible so that color measurements relate to the color characteristics of incident light on he subject, rather than to reflected light from the subject, which may possess an unusual color bias. The tendency, consequently, has been to find ways of predicting white balance by comparing illumination levels for isolated areas of the ambient spectrum (that is, without resort to a white card). In U.S. Pat. No. 4,584,598, and still video camera utilizes the luminous intensities of two areas of the ambient spectrum (mercury and certain infra-red wavelengths to identify the character of the light source and to provide corresponding gain adjustments.

These two patents illustrate that color balance and exposure control, which are distinctly separate procedures, ordinarily utilize distinct circuitry in functionally-different sections of the camera. Whereas exposure control is derived in relation to the image signal, necessitating (in the case of the '016 patent) special "in-line" processing of the image signal, color balance is preferably derived from a broader external view provided by dedicated sensors on the camera body. The color balance processing is accordingly done "off-line" in relation to the image signal.

SUMMARY OF THE INVENTION

It is usually desirable to economize where ever possible by exploiting one device or circuit for several functions. Exposure control and color balance are both based on similar light measurement functions. However, it is difficult to find common ground between these functions as long as one is an "in-line" process on the image signal and the other is an "off-line" process on ambient illumination. By designing a common process of measurement and using a set of dedicated sensors that sample both the ambient scene and the image light, it is possible to relate the exposure control and color balance measurements to a common measuring circuit that is capable of performing either function—albeit sequentially rather than simultaneously.

A still video camera according to the invention includes a color image sensor responsive to image light from an illuminated subject and a signal processing section for processing a color signal generated by the image sensor. An exposure sensor generates an exposure signal corresponding to the brightness of the image light directed toward the sensor while a separate color balance sensor generates one or more color balance signals corresponding to the light illuminating the subject. The measurement function is provided by a common integrating circuit which integrates an input signal in relation to time and generates a control signal therefrom. The integration is selectively operated either in relation to the exposure signal from the exposure sensor or the color balance signals from the color balance sensor. The control signal from the integrator is thus useful for controlling the exposure provided to the image sensor (exposure control) or the gain applied to the signal processing section (color balance).

In further refinements, the color balance sensor comprises a plurality of color-responsive photosensors and the selective operation of the integrator is provided by multiplexing each color-responsive photosensor, and the exposure sensor, into the input circuit of the integrator. In a further aspect of the invention, if the exposure signal corresponds to a small photocurrent derived from a small sample of image light, the exposure sensor can remain connected into the integrator input while only the color-responsive photosensors are multiplexed. In effect, the much greater color balance photocurrents, when selected, swamp the exposure photocurrent with no ill effect upon color balance measurements.

BRIEF DESCRIPTION OF THE DRAWINGS

The invention will be described with reference to the drawings, in which:

FIG. 1A is a block diagram of a video still camera incorporating common color balance and exposure control circuitry according to the invention; and FIG. 1B is a diagram showing a modification of the photodiode circuit shown by the block diagram of FIG. 1A.

DETAILED DESCRIPTION OF THE PREFERRED EMBODIMENT

Referring to FIG. 1, a still video camera is illustrated having an optical section 10 for directing image light from a subject (not shown) to an imager 11 through a partially transmissive mirror 12 and a color filter 13. A diaphragm 14 regulates the optical aperture (through which image light passes) by a linkage with a diaphragm driver 15. A shutter 16 regulates the exposure time (of image light upon the imager 11) by a linkage with a shutter driver 17. As is well known, exposure is a function of light intensity and time, which are respectively controlled by the diaphragm 14 and the shutter 16. Automatic control of the exposure parameters requires a measurement, which is initiated by diverting a small sample (usually less than 5%) of the image light by means of the mirror 12 through a converging lens 18 upon an exposure photodiode 19. The optical section 10 collects image light from a relatively small surrounding area to include reflected light from the subject. Exposure control is thus based on a sample of the scene observed by the image sensor 11.

The video signal generated by the imager 11 is applied to a signal processing circuit 20, which separates the colors (red, green, and blue) by means of a sequencer 21, applies gain corrections in separate gain-controlled amplifiers 22a, 22b and 22c, and processes the gain-corrected color signals through a matrix 24. The matrix 24 produces a luminance (Y) signal and a line-sequential stream of color difference signals (R-Y, B-Y). The luminance signal and the color difference signals are input to a modulator 26, which provides a selected preemphasis to the input signals and frequency modulates a suitable set of carriers with the preemphasized signals. The modulated signal is amplified by a head driver circuit 28 and applied to a recording head 30, which records the modulated signal on a suitable medium (not shown), such as a magnetic disk.

Automatic color balance is obtained by varying the gain signal applied to the amplifiers 22a and 22c on respective lines 32a and 32c. (A fixed gain signal is applied to the green amplifier 22b on a line 32b.) Color balance information is produced by three photodiodes 34a, 34b and 34c, which are respectively shaded by three infra-red filters 36a, 36b and 36c and red, green and blue filters 38a, 38b and 38c. As a consequence of the color filters 38a, 38b and 38c, the photodiode 34a responds to red light, the photodiode 34b to green light, and the photodiode 34c to blue light. The set of photodiodes 34 have a field of view that is independent of, and ordinarily greater than, the field of view of the optical section 10 so that a reasonable sample of ambient, or surrounding, illumination can be seen. This is important because color balance should be based on a sample of the light illuminating the subject, and not the light reflected from the subject, which may possess a color bias unrelated to the color characteristics of the illuminant.

The collection and processing of color and exposure information according to the invention is under the control of a computer 42. A multiplexer 44 receives instructions from the computer 42 to ground the anode of a selected one of the photodiodes 19, 34a, 34b or 34c. The grounded photodiode provides a circuit path for the flow of photocurrent to a measuring circuit 46. The circuit 46, which employs an integration cycle in its measuring process, cooperates with a counting procedure (exemplified by a timer 48) in the computer 42 to arrive at a brightness value of either the image light or a selected spectral region of the ambient light. The measuring circuit 46 includes an integrator composed of a capacitor 50 connected between the inverting input and the output of an operational amplifier 52. The output of the amplifier 52 is an integral over time of the photocurrent produced by the selected photodiode 19, 34a, 34b or 34c and applied on a line 51 to the inverting input of the amplifier 52. A reset switch 54 is connected across the capacitor 50 for resetting the circuit 46 according to the condition of a signal INT on a line 56 from the computer 42.

The output voltage of the amplifier 52 and a reference voltage $V_R$ are provided to a comparator 58. The value $V_R$ is output as a digital number from the computer 42 and converted into an analog voltage by the digital-to-analog (D/A) converter 60. The analog voltage $V_R$ is switched through a multiplexer 62 (controlled by the computer 42) to the comparator 58 when a voltage comparison is required. The output voltage of the amplifier 52 increases until it equals the reference voltage $V_R$. When equality occurs, the output of the comparator 58, which is connected to the computer 42, changes state, thereby indicating the end of an integration cycle. The computer 42 includes the timer 48, which can be zeroed at the beginning of an integration cycle and stopped when the comparator 58 changes state. The value in the counter 48 at that moment therefore represents the integration time, which corresponds to the brightness of the light received by a selected photodiode 19, 34a, 34b or 34c. The type of control circuit employed is further described in connection with exposure control systems in U.S. Pat. No. 4,503,508 and Research Disclosure items 21504 (March, 1982; pp. 70–71) and 22822 (April, 1983; pp. 157–159).

The measuring circuit 46 is operated selectively with respect to the photodiodes 19, 34a, 34b and 34c in order to obtain a set of four counter values corresponding to the brightness of the image light and each respective part of the ambient spectrum. The exposure counter value, that is, the value representative of the brightness of the image light, is conventionally processed in order to obtin aperture and/or exposure time values for operation of the diaphragm 14 and the shutter 16. The particular exposure algorithm employed for this calculation is of no consequence for practice of this invention. Depending on the exposure mode provided to the computer 42 on a line 63 (e.g., aperture preferred or shutter preferred), shutter and aperture values on respective input lines 64 or 65 are incorporated into the algorithm to calculate the unspecified exposure value. If the selected mode is a fully automatic mode, both shutter and aperture values are generated from the particular exposure algorithm employed. If the mode is manual, and both values are specified, there is no requirement for automatic exposure control, except for purposes of display or for operation of ancillary apparatus, such as an electronic viewfinder (not shown).

The color balance counter values, that is, the values representative of the brightness of red, green and blue ambient light, are formed into ratios (red/green and blue/green) and applied to a set of R/G and B/G tables 66. The tables contain a digital representation of the particular gain control adjustment for each R/G, B/G ratio that will produce a suitable white balance when applied to the red and blue channels. From these tables 66, the corresponding (blue) white balance (BWB) and (red) white balance gain (RWB) voltages are generated by the computer 42 and applied to the aforementioned D/A converter 60. The converted red and blue gain control voltages are switched through the multiplexer 62 to a dual sample/hold circuit 68. The sampled red and blue gain control voltages are provided on respective lines 32a and 32c to the red and blue amplifiers 22a and 22c, which are accordingly adjusted in gain to automatically obtain white balance.

The technical advantages of the invention are obtained by having one measuring circuit 46, instead of several, determine a plurality of control signals for operation of the video camera, namely, the exposure control value and the red, green, and blue color balance control values. The multiplexer 44 enables various types of selections between the photodiodes 19, 34a, 34b and 34c. Use of a common circuit 46 means that its various measurements must be distinguished one from another. When the computer 42 instructs the multiplexer 44 to activate a particular photodiode, say diode 34b, the computer 42 also prepares the counter 48 for the coming count and knows that the resulting count, say, of a particular green value, will be incorporated in the corresponding algorithm, say, the R/G and B/G ratios. The calculations may be done in a set sequence, that is, for example, image light first, red light second, green light third, and blue light fourth. Alternatively, the exposure diode may remain in the input circuit of the measuring circuit 46 (for example, to control exposure of an electronic viewfinder (not shown)) and the color balance diodes 34a, 34b and 34c only selected when a shutter button (not shown) is actuated by the camera user.

FIG. 1B shows a modification that does not require overt selection of the exposure diode 19 by the multiplexer 44. If the mirror 12 only diverts a small amount of image light, e.g., 5%, the photocurrent generated by the diode 19 is very small in comparison to the photocurrents from any of the diodes 34a, 34b, or 34c, which each receive a full dose of ambient illumination. With that in mind, the diode 19 can always remain connected into the input circuit of the measuring circuit 46 (as shown by FIG. 1B). The effect of multiplexed operation is obtained by operating circuit 46 in its exposure measurement mode only when the multiplexer deselects all color balance photodiodes 34a, 34b and 34c. In the color measurement mode, multiplexer 44 connects a particular photodiode 34a, 34b or 34c into the input circuit of the measuring circuit 46. The photocurrent produced on the line 51 from the color balance photodiode 34a, 34b, or 34c, effectively swamps, or overwhelms, the very small current from the diode 19. Correct color balance is nonetheless obtained despite the contribution of the very small exposure photocurrent.

The invention has been described in detail with particular reference to a presently preferred embodiment, but it will be understood that variations and modifications can be effected within the spirit and scope of the invention.

What is claimed is:

1. A video camera having a color image sensor responsive to image light from an illuminated subject and a signal processing section for processing a color signal generated by the image sensor, said camera comprising:

exposure sensing means for generating an exposure signal corresponding to the brightness level of the image light directed toward the image sensor;

color balance sensing means for generating one or more color balance signals corresponding to the color characteristics of the light illuminating the subject;

means, having an input, for integrating an input signal in relation to time and generating a control signal therefrom;

means for connecting said exposure sensing means and said color balance sensing means to the input of said integrating means;

means for selectively operating said integrating means in relation to either said exposure sensing means or said color balance sensing means so that said control signal predominantly represents either an integrated exposure signal or an integrated color balance signal; and means responsive to said control signal for controlling either the exposure of image light upon the image sensor or the color balance of the color signal processed by the signal processing section.

2. A video camera as claimed in claim 1 which includes an optical section for directing the image light toward the image sensor and wherein said exposure sensing means is responsive to a sample of image light diverted from its path toward the image sensor.

3. A video camera as claimed in claim 2 in which said color balance sensing means includes red, green and blue photosensors for generating corresponding photocurrents for the respective regions of the spectrum.

4. A video camera as claimed in claim 1 in which said exposure sensing means comprises a photodiode for generating a photocurrent corresponding to the brightness level of the image light; said color balance sensing means comprises a plurality of photodiodes, each sensitive to a different region of the spectrum, for generating photocurrents corresponding to respective regions of the spectrum; and said means for selectively operating said integrating means grounds a selected photodiode so as to provide the corresponding photocurrent to said integrating means.

5. A video camera as claimed in claim 1 in which said means for selectively operating said integrating means interacts with said color balance means to provide one of said color balance signals to be combined with said exposure signal, to combination thereof to be provided as an input signal to said integrating means.

6. A still video camera having an optical section for directing image light from an illuminated subject toward an image sensor and a signal processing section for processing a plurality of color signals derived from the image sensor, said camera comprising:

exposure sensing means for generating an exposure signal corresponding to the brightness of the image light directed toward the sensor;

color balance sensing means for generating a plurality of color balance signals corresponding to the color characteristics of the light illuminating the subject;

means for integrating an input signal in relation to time and generating a control signal therefrom;

multiplexer means for selectively providing either said exposure signal or one of said color balance signals to said integrating means as said input signal thereof; and means responsive to said control signal for separately controlling the intensity and/or the duration of the image light impinging upon the image sensor and the relative amplitude of the color signals processed by said signal processing section.

7. A still video camera as claimed in claim 4 in which said color balance sensing means includes at least two separate photosensors and said multiplexer means operates in a predetermined sequence to provide said exposure and said color balance signals from said separate photosensors to said integrating means.

8. A still video camera having an optical section for controlling the exposure of an image sensor with image light from an illuminated subject and a signal processing section for converting the output of the image sensor into a plurality of color signals and for processing the color signals in respectively separate channels, said camera comprising:

an exposure photosensor for generating an exposure signal having a photocurrent amplitude corresponding to the brightness of the image light;

a plurality of color balance photosensors for generating a plurality of color balance signals having respective photocurrent amplitudes corresponding to respective color characteristics of the light illuminating the subject;

means for integrating an input signal in relation to time and generating a control signal therefrom;

circuit means connecting said exposure photosensor into the input circuit of said integrating means;

multiplexer means for selectively connecting said color balance photosensors into the input circuit of said integrating means; and means responsive to said control signal for either controlling the exposure of the image sensor or, in response to a selection by said multiplexer means, for controlling the gain applied to at least one of the color signals.

* * * * *